(12) United States Patent
Davie

(10) Patent No.: US 7,281,043 B1
(45) Date of Patent: Oct. 9, 2007

(54) SYSTEM FOR SHARING RESOURCES AMONG RSVP SESSIONS

(75) Inventor: Bruce S. Davie, Belmont, MA (US)

(73) Assignee: Cisco Technology, Inc., San Jose, CA (US)

( * ) Notice: Subject to any disclaimer, the term of this patent is extended or adjusted under 35 U.S.C. 154(b) by 893 days.

(21) Appl. No.: 09/871,108

(22) Filed: May 31, 2001

(51) Int. Cl.
- G06F 15/173 (2006.01)
- H04L 12/28 (2006.01)
- G08C 15/00 (2006.01)

(52) U.S. Cl. .................................. 709/226; 370/395.4

(58) Field of Classification Search ................ 709/219, 709/226, 239; 370/231, 252, 395.4
See application file for complete search history.

(56) References Cited

U.S. PATENT DOCUMENTS

| | | | |
|---|---|---|---|
| 6,188,760 B1 | 2/2001 | Oran et al. | |
| 6,282,192 B1 | 8/2001 | Murphy et al. | |
| 6,286,052 B1 | 9/2001 | McCloghrie et al. | |
| 6,295,296 B1 | 9/2001 | Tappan | |
| 6,363,478 B1 * | 3/2002 | Lambert et al. | 713/151 |
| 6,411,705 B2 | 6/2002 | Oran et al. | |
| 6,434,624 B1 | 8/2002 | Gai et al. | |
| 6,449,251 B1 * | 9/2002 | Awadallah et al. | 370/229 |
| 6,487,217 B1 | 11/2002 | Baroudi | |
| 6,493,317 B1 | 12/2002 | Ma | |
| 6,598,077 B2 * | 7/2003 | Primak et al. | 709/219 |
| 6,744,767 B1 * | 6/2004 | Chiu et al. | 370/395.21 |

OTHER PUBLICATIONS

RSVP, Cisco Systems Incorporated, 1992-2002.* i2052 Software Phone, http://www.nortelnetworks.com/products/01/m6500/international/i2052_uk.html, Nortel Networks, 2001, pp. 1-2.

Leite, M., et al., Intel® Internet Phone SDK Enhances Net Phone Quality, Intel® Developer UPDATE Magazine, Sep. 2000, pp. 1-6.

Clark, E., The Resource Reservation Protocol, NetworkMagazine.com, Aug. 2001, pp. 1-4.

Resource Reservation Protocol (RSVP), Cisco Systems Incorporated, San Jose, California, 1992-2002, pp. 43-1-43-12

Braden, R., et al., The Design of the RSVP Protocol, USC/Information Sciences Institute Final Report, Contract DAPT63-01-C-0001, 1993-1995, pp. 1-21.

(Continued)

*Primary Examiner*—Jason Cardone
*Assistant Examiner*—Tanim Hossain
(74) *Attorney, Agent, or Firm*—Cesari and McKenna LLP

(57) ABSTRACT

A system associates multiple discrete traffic flows within a computer network into a group, and allows the traffic flows corresponding to a given group to share a single set of resources. A sourcing entity preferably generates a locally unique resource identifier (ID) for use in requesting a reservation of network resources for a first traffic flow or session. Intermediate network devices within the computer network reserve a set of resources and associate the reservation with the specified resource ID. The sourcing entity may then re-use this same resource ID in a subsequent request to reserve resources for a second traffic flow or session. The intermediate network devices determine that a reservation made by the sourcing entity and associated with this resource ID already exists and, rather than reserve additional or further resources for the second traffic flow or session, share the previously reserved resources between the two traffic flows or sessions.

34 Claims, 9 Drawing Sheets

OTHER PUBLICATIONS

Jappila, P., RSVP, Nokia Telecommunications, 1999, pp. 1-5.

Zhang, L., et al., RSVP: A New Resource ReSerVation Protocol, IEEE Network Magazine, 1993, pp. 1-22.

RSVP Soft State Implementation, Cisco Systems Incorporated, San Jose, California, 1988-1997, pp. 1-2.

Welcher, P., Resource Reservation Protocol, RSVP, Mentor Technologies, Feb. 1999, pp. 1-6.

Wroclawski, J., The Use of RSVP with IETF Integrated Services, Internet Engineering Task Force, Request For Comments (RFC) 2210, http://www.ietf.org, Sep. 1997, pp. 1-33.

Herzog, S., RSVP Extensions for Policy Control, Internet Engineering Task Force, Request for Comments (RFC) 2750, http://www.ietf.org, Jan. 2000, pp. 1-13.

\* cited by examiner

FIG. 6

RSVP SESSION TABLE 600

| SESSION GROUP ID 614 | | SOURCE PORT 606 | DESTINATION ADDRESS 608 | DESTINATION PORT 610 | PREVIOUS HOP ADDRESS 612 |
|---|---|---|---|---|---|
| SOURCE ADDRESS 602 | RESOURCE ID 604 | | | | |
| 123.100.106.148 | 42578 | 555 | 111.222.104.205 | 777 | 123.115.119.102 |
| 155.136.114.101 | 11258 | 718 | 222.123.154.158 | 123 | 154.122.166.177 |
| 165.225.147.174 | 621 | 951 | 156.189.208.205 | 551 | 222.211.155.156 |
| 203.238.237.106 | 9852 | 114 | 482.628.341.682 | 214 | 123.118.150.160 |
| 123.100.106.148 | 42578 | 555 | 111.132.141.168 | 777 | 123.116.118.012 |
| 123.100.106.148 | 42580 | 555 | 112.133.114.255 | 119 | 123.116.118.012 |

616a, 616b, 616c, 616d, 616e, 616f

SYSTEM FOR SHARING RESOURCES AMONG RSVP SESSIONS

BACKGROUND OF THE INVENTION

1. Field of the Invention

This invention relates to computer networks and, more specifically to the reservation of bandwidth in computer networks.

2. Background Information

Computer networks typically comprise a plurality of interconnected entities. An entity may consist of any device, such as a computer or end station, that "sources" (i.e., transmits) or "sinks" (i.e., receives) datagrams (e.g., packets and/or frames). A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information between a plurality of LANs or end stations. Bridges and switches may operate at various levels of the communication protocol stack. For example, a switch may operate at layer 2 which, in the Open Systems Interconnection (OSI) Reference Model, is called the data link layer and includes the Logical Link Control (LLC) and Media Access Control (MAC) sub-layers. Data frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto the destination port(s) associated with that MAC destination address.

Other network devices, commonly referred to as routers, may operate at higher communication layers, such as layers 3 and 4 of the OSI Reference Model, which in Transmission Control Protocol/Internet Protocol (TCP/IP) networks corresponds to the IP and the TCP/User Datagram Protocol (TCP/UDP) layers. Data frames at the IP layer include a header which contains an IP source address and an IP destination address, while frames at the TCP/IP layer include source and destination port numbers. Routers or layer 3 switches may re-assemble or convert received data frames from one LAN standard (e.g., Ethernet) to another (e.g. token ring). Thus, layer 3 devices are often used to interconnect dissimilar subnetworks.

Voice Over IP (VoIP)

Traditionally, computer networks were used to exchange static files or data, such as text and spreadsheet files, while the Public Switched Telephone Network (PSTN) was used to exchange voice information. Computer networks, however, are increasingly being used to transport "voice" information. Voice over IP (VoIP) typically refers to a group of technologies used to transmit voice information over computer networks. Such networks include a plurality of voice agents that convert voice information from its traditional telephony form to a form that is suitable for packet transmission. In other words, the voice agent encodes, compresses and encapsulates the voice information into a plurality of data packets. Examples of voice agents include IP telephones, VoIP gateways, certain private branch exchanges (PBXs), personal computers (PCs) running communication applications, network devices providing voice gateway services, etc. A calling party uses a voice agent to initiate a VoIP call. Once the voice information has been converted into packet format, it is carried by the computer network to a second voice agent configured to serve the called party. Voice traffic, unlike static data files or records, is highly sensitive to delay and to lost packets. That is, delays in receiving data packets carrying voice information at the called party's voice agent can seriously degrade the quality of the call. Accordingly, packets carrying voice information must be delivered to the called party with high probability and in a timely manner.

Computer networks include numerous services and resources for use in forwarding network traffic. For example, different network links, such as Fast Ethernet, Asynchronous Transfer Mode (ATM) channels, SONET links, satellite links, etc., offer different speed and bandwidth capabilities. Particular intermediate devices also include specific resources or services, such as priority queues, filter settings, traffic shapers, queue selection strategies, congestion control algorithms, etc. that affect the rate at which traffic moves through the device and thus across the network. Depending on the selection or allocation of such resources or services, network traffic for different sources and sinks can be forwarded at different speeds or rates, thereby controlling the loss and/or delay experienced by the traffic.

The Resource Reservation Protocol

As set forth above, to support VoIP, packets carrying voice information must typically be delivered within narrow time constraints. Although many computer networks have the resources and services to meet the delivery requirements of VoIP, these resources and services must be allocated, preferably in advance, to the correct network traffic. The Resource reSerVation Protocol (RSVP), which is set forth at RFC 2205, is a signaling protocol that was developed so that entities (typically referred to as receivers) could reserve bandwidth within their computer networks to receive from one or more sourcing entities a desired traffic flow, such as multimedia stream. Pursuant to RSVP, sources send RSVP Path messages identifying themselves and indicating the bandwidth needed to receive their programming or content. These messages proceed hop-by-hop through the intermediate network devices, making those devices aware of the possibility that a reservation of resources may be required. If a receiver is interested in the programming or content offered by a particular source, it responds with a RSVP Reservation (Resv) message, which travels hop-by-hop back to the source. At each hop, the corresponding intermediate device establishes a session for the receiver and sets aside sufficient resources to provide the requested bandwidth for the desired traffic flow. These resources are immediately made available to the traffic flow. If the resources are not available, the reservation is refused explicitly so that the receiver knows it cannot depend on the corresponding resources being devoted to its traffic. By using RSVP, packets carrying voice information can be accorded the resources and services they need to ensure timely delivery.

VoIP telephones and voice applications are increasingly being offered with greater feature sets. One such feature is "call waiting", which is a common service or feature of conventional, analog telephone sets. With call waiting, a first party who is on the phone with a second party is alerted to an incoming call from a third party. The first party can put the second party on hold and answer the call from the third party. The first party can even alternate back and forth between second and third parties. VoIP telephones and voice applications support of call waiting, however, can create potential problems, such as the setting aside of resources unnecessarily.

In particular, the VoIP telephone or application will typically use RSVP to reserve separate resources along the entire route to both the second and third parties to support the two calls. However, because call waiting only allows the first party to talk to either the second or the third party at any given point in time, only one set of the resources will be in use at any instant. That is, at any given time, the VoIP telephone or application will be generating packets for forwarding to either the second party or the third party, but not both. Nonetheless, resources will remain reserved to support traffic to both the second and third parties at all times. As a result, resources that could be applied to other traffic are wasted. In addition, the request to reserve resources for the third party may fail admission control at one or more devices along that portion of the route shared with the second party even though a separate set of resources are really not required. This would result in the voice traffic to or from the third party being denied access to adequate resources and thus severely degrading the "quality" of the call, even though resources set aside for the second party remain idle.

SUMMARY OF THE INVENTION

Briefly, the present invention relates to a system that associates discrete traffic flows or sessions within a computer network with a group, and allows the traffic flows or sessions corresponding to a given group to share a single set of network resources. Specifically, when a sourcing entity, such as a voice agent, requests resources to be reserved within the computer network for a first session, i.e., a traffic flow directed to a first receiving entity, the sourcing entity generates a locally unique resource identifier (ID). The sourcing entity then uses this resource ID in its request to reserve resources for the first traffic flow. Intermediate network devices within the computer network reserve a set of resources and associate the reservation with the specified resource ID. The sourcing entity may then reuse this same resource ID in another reservation request for a second session, i.e., a traffic flow directed to a second receiving entity. In accordance with the present invention, intermediate network devices are configured to recognize that a reservation made by the sourcing entity and associated with this resource ID already exists. The intermediate devices are further configured to share the previously reserved resources between the first and second sessions, rather than reserve additional or further resources for the second session.

BRIEF DESCRIPTION OF THE DRAWINGS

The invention description below refers to the accompanying drawings, of which:

FIG. 6 is a highly schematic diagram of a data structure in accordance with the present invention.

DETAILED DESCRIPTION OF AN ILLUSTRATIVE EMBODIMENT

Figure 1:
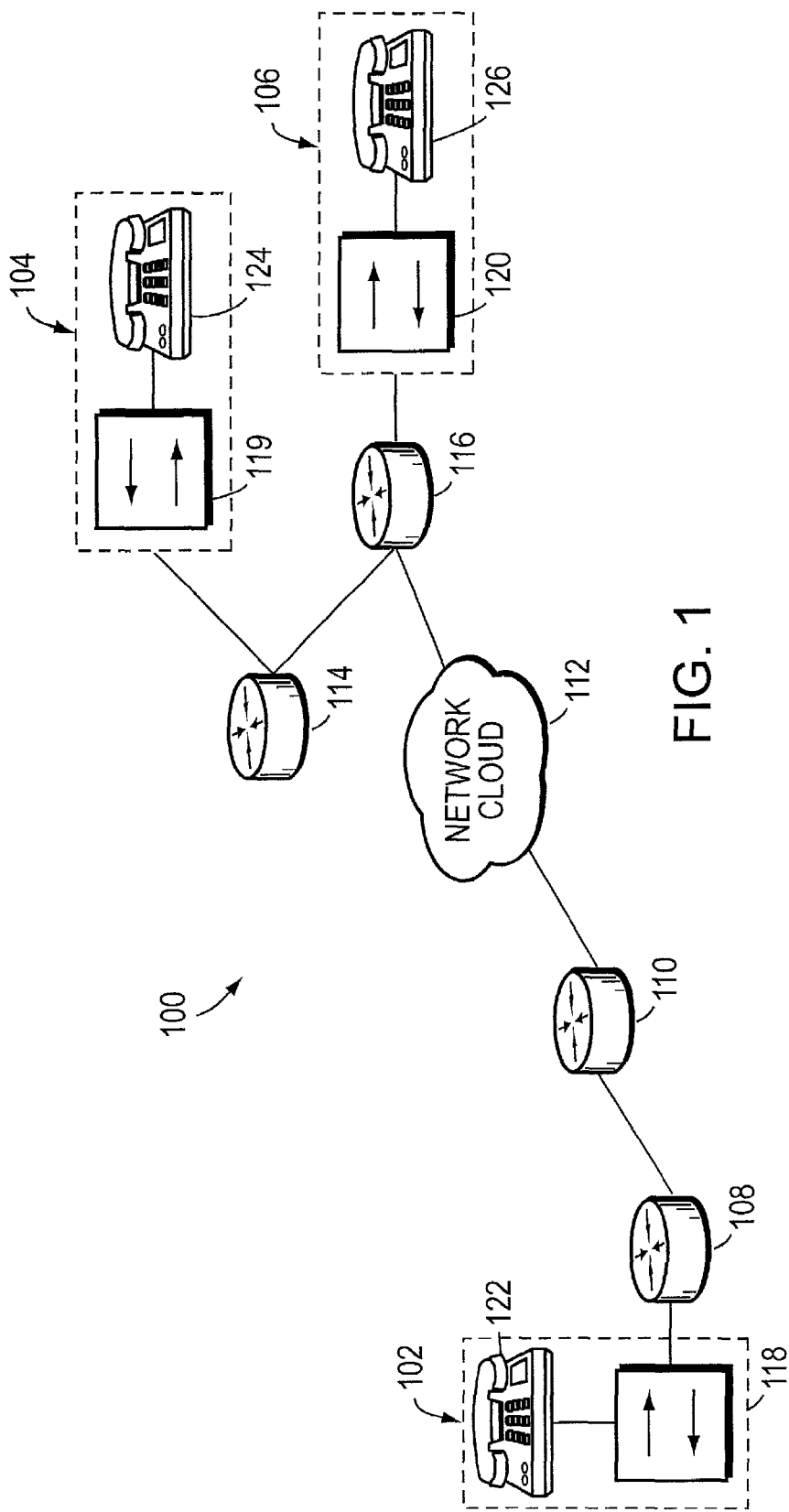
FIG. 1 is a highly schematic diagram of a computer network.

FIG. 1 is a highly schematic diagram of a computer network 100. The network 100 includes first, second and third voice agents 102, 104, 106 that are interconnected by a plurality of intermediate network devices. More specifically, first voice agent 102 is coupled to a first hop network device, such as router 108, which, in turn, is coupled to a second network device, such as router 110. Router 110, in turn, is coupled to a network cloud 112. The network cloud 112 may consist of a plurality of network devices, local area networks (LANs), and end stations. Second voice agent 104 is coupled to a first hop network device, such as router 114, which is coupled to router 116. Router 116, in turn, is coupled to network cloud 112. Third voice agent 106 is coupled to router 116.

In the illustrative embodiment, voice agents 102, 104, 106 are intermediate network devices 118-120 that have been configured to provide VoIP gateway support to other devices or entities, such as conventional analog telephone sets 122-124, coupled thereto. Suitable VoIP gateway devices include the 3600 series of routers from Cisco Systems, Inc. of San Jose, Calif.

It should be understood that the network configuration 100 of FIG. 1 is for illustrative purposes only and that the present invention will operate with other, possibly far more complex, network topologies.

Figure 2:
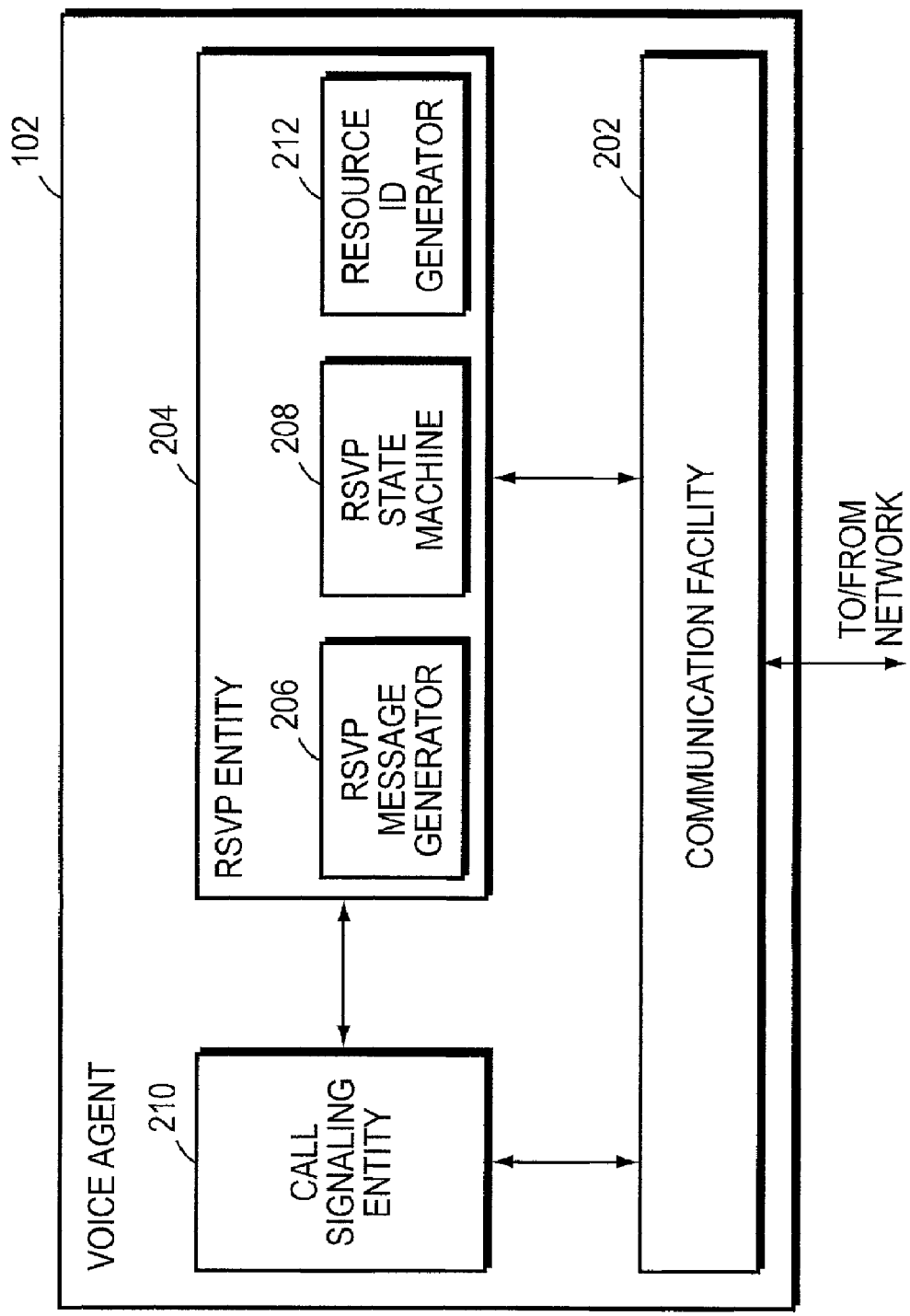
FIG. 2 is a highly schematic block diagram of a voice agent in accordance with the present invention.

FIG. 2 is a highly schematic, partial block diagram of a voice agent, such as voice agent 102. Voice agent 102, more specifically device 118, preferably includes a communication facility 202 and one or more resource reservation components, such as a Resource reSerVation Protocol (RSVP) entity or engine 204. As described herein, the RSVP entity 204, which includes a RSVP message generator 206 and a RSVP state machine engine 208, operates, except as described herein, in accordance with the RSVP specification standard, which is set forth at RFC 2205 and is hereby incorporated by reference in its entirety. Voice agent 102 further includes a call signaling entity 210 in communicating relationship with the RSVP entity 204 and the communication facility 202. Entity 210 operates in accordance with a signaling protocol, such as H.323, Session Initiation Protocol (SIP), Media Gateway Control Protocol (MGCP) or MEGACO, which is an extension of MGCP. The RSVP entity 204 is also in communicating relationship with the communication facility 202, and can thus exchange information, including network packets and frames with facility 202. In accordance with the present invention, RSVP entity 204 further includes a resource identifier (ID) generator 212. As described below, resource ID generator 212 is configured to generate IDs for use by the RSVP entity 204 in reserving resources within computer network 100 (FIG. 1).

The communication facility 202 preferably includes one or more software libraries for implementing a communication protocol stack allowing voice agent 102 to exchange messages with other entities of network 100, such as voice agents 104 and/or 106. The communication facility 202 may, for example, include software layers corresponding to the Transmission Control Protocol/Internet Protocol (TCP/IP) communication stack, although other communication protocols, such as Asynchronous Transfer Mode (ATM) cells, the Internet Packet Exchange (IPX) protocol, the AppleTalk protocol, the DECNet protocol and/or NetBIOS Extended User Interface (NetBEUI) could be utilized. Communication facility 202 further includes transmitting and receiving circuitry and components, including one or more network interface cards (NICs) that establish one or more physical ports for exchanging data packets and frames with router 108 to which it is connected.

In accordance with the preferred embodiment, voice agent 102 includes programmable processing elements (not shown), which may contain software program instructions pertaining to the methods of the present invention. Other computer readable media may also be used to store the program instructions of the present invention.

Figure 3:
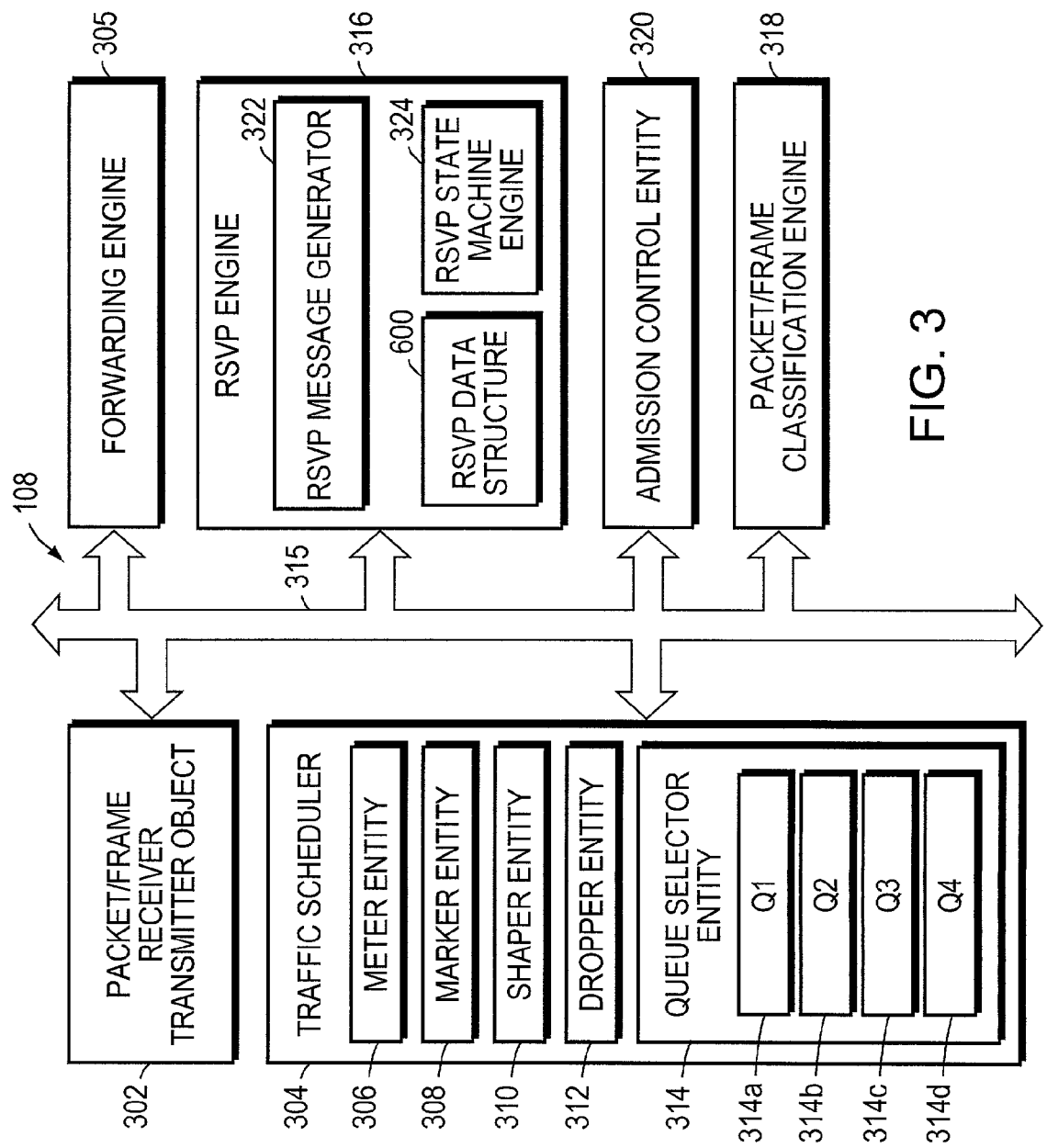
FIG. 3 is a highly schematic block diagram of an intermediate network device in accordance with the present invention.

FIG. 3 is a highly schematic, partial, functional block diagram of an intermediate network device in accordance with the present invention, such as router 108, which is the first hop router from voice agent 102. Router 108 preferably includes one or more packet/frame receiver transmitter object 302, a traffic scheduler 304, and a forwarding engine 305. The packet/frame receiver transmitter object 302 is preferably configured to provide one or more interfaces or ports for receiving and sending network messages by router 108. The traffic scheduler 304 includes a plurality of resources or services that are used by router 108 to forward packets. For example, scheduler 304 may include one or more metering entities 306, one or more marker entities 308, one or more shaper entities 309, one or more dropper entities 310, and one or more queue selector entities 312. The queue selector entity 312, moreover, includes or has access to a plurality of queues 314a-d which buffer packets for the interfaces and/or ports that have been configured at router 108. The packet/frame receiver transmitter object 302, the traffic scheduler 304, and forwarding engine 305 are in communicating relationship with each other via one or more communication paths or bus structures, such as system bus 315, so that network messages as well as commands may be exchanged between them.

Router 108 further includes one or more resource allocation and reservation components. In the preferred embodiment, router 108 includes a RSVP entity or engine 316, a packet/frame classification engine 318, and an admission control entity 320. The RSVP engine 316, moreover, includes a RSVP message generator 322, a RSVP state machine engine 324 and a data structure 600 for storing RSVP information. RSVP engine 316 similarly operates, except as described herein, in accordance with the RFC 2205 specification standard. Router 108 also includes programmable processing elements (not shown), which may contain software program instructions pertaining to the methods of the present invention. Other computer readable media may also be used to store the program instructions of the present invention.

A suitable platform for router 108 is the 7200 or 4700 series of routers from Cisco Systems, Inc. Nonetheless, those skilled in the art will recognize that the present invention, or parts thereof, may be implemented in other network devices and/or entities, such as switches, router-switches, bridges, repeaters, servers, etc.

Figure 4A:
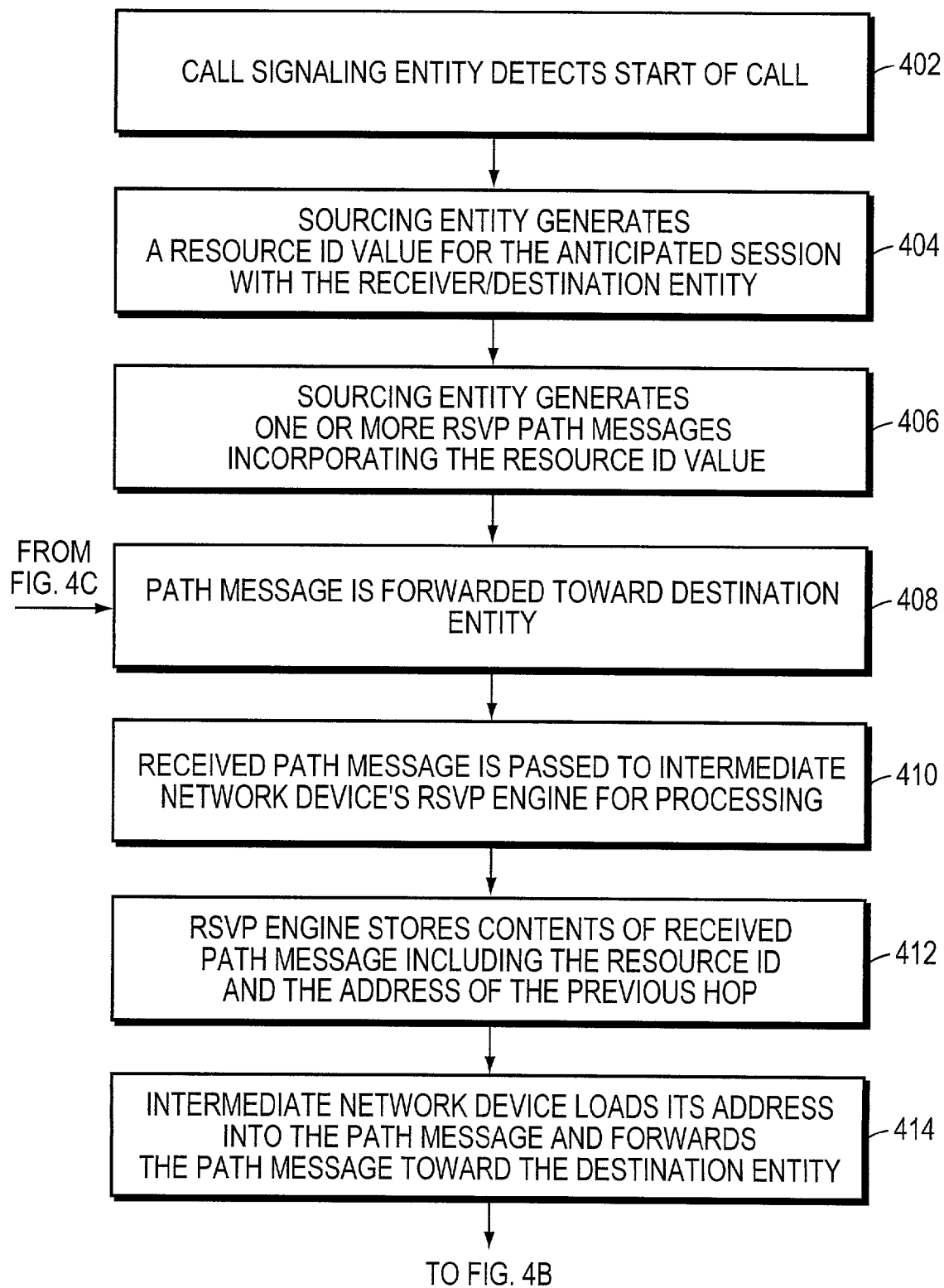
FIGS. 4A-D is a flow diagram of the method of the present invention.

FIGS. 4A-D is a flow diagram of the method of the present invention. Suppose, for example, that a first party utilizes voice agent 102 (FIG. 1) to place a call to a second party at voice agent 104. The first party may dial a series of numbers at the analog telephone set 122 that correspond to voice agent 104. To insure that the anticipated voice traffic from voice agent 102 is forwarded through the computer network 100 in a timely manner, i.e., with minimal delay, voice agent 102 (in cooperation with agent 104 as described below) preferably causes sufficient resources to be reserved across the computer network 100 to meet the time constraints of voice traffic. Preferably, the call signaling entity 210 at device 118 detects the start of a call from telephone set 122 to voice agent 104, as indicated at block 402 (FIG. 4A).

In response, voice agent 102 generates a locally unique resource ID value, e.g., "42578", for use with the reservation of network resources about to be made for the session with voice agent 104, as indicated at block 404. In this context, "locally unique" means that the chosen resource ID value is not currently in use by voice agent 102 for any other call. Call signaling entity 210 may, for example, issue one or more Application Programming Interface (API) system calls to RSVP entity 204 causing it to have the resource ID generator 212 produce a resource ID value. The resource ID generator 212 may be configured as a random number generator for producing 32-bit strings. The RSVP message generator 206 then formulates one or more RSVP Path messages that incorporate the generated resource ID value, as indicated at block 406. Another API system call may be used by the call signaling entity 210 to direct the RSVP entity 204 to generate the Path message.

Figure 5:
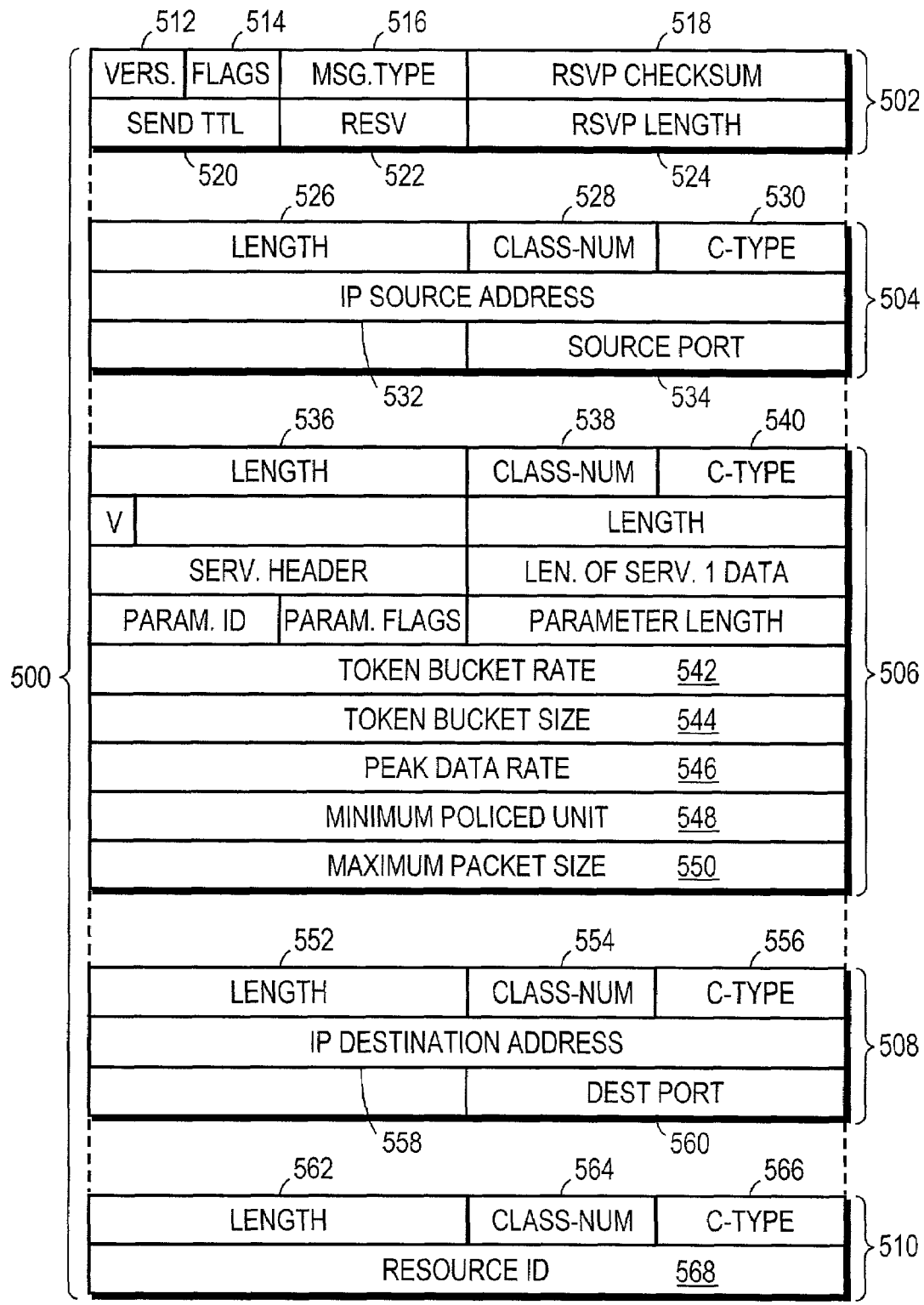
FIG. 5 is a highly schematic diagram of a network reservation message in accordance with the present invention.

FIG. 5 is a schematic block diagram of a Path message 500 in accordance with the present invention. The Path message 500 includes a header 502, a sender Template object 504, a sender Tspec object 506, a session object 508 and a resource ID object 510, each of which has a plurality of fields. In particular, the header 502 has a version field 512, a flags field 514, a message type field 516, a RSVP checksum field 518, a Send Time To Live (TTL) field 520, a reserved field 522 and a RSVP length field 524. The sender Template object 504 has a length field 526 (loaded with the length of the respective object), a class number field (C-Num) 528 and a class type (C-type) field 530. It further includes an IP source address (SA) field 532, a source port number field 534 and may include one or more un-used fields.

The sender Tspec object 506 includes length field 536, class number and class type fields 538, 540. It further includes a token bucket rate field 542, a token bucket size field 544, a peak data rate field 546, a minimum policed unit field 548 and a maximum packet size field 550, among others. The session object 508 includes length, class number and class type fields 552, 554, 556. It further includes IP destination address (DA) and destination port fields 558, 560. The resource ID object 510 includes length, class number and class type fields 562, 564, 566. It further includes a resource ID field 568.

Message generator 206 loads header 502, sender Template object 504, sender Tspec object 506, and session object 508 in a conventional manner. In particular, it loads the IP SA and source port fields 532, 534 with the IP address and Transmission Control Protocol/User Datagram Protocol (TCP/UDP) port being utilized by voice agent 102. It similarly loads the IP DA and destination port fields 558, 560 with the IP address and TCP/UDP port (if known) for voice agent 104. Message generator 206 loads the sender Tspec object 506 with values corresponding to the network resources, e.g., the bandwidth, that voice agent 102 believes will be required to support the anticipated traffic flow to voice agent 104. The value generated by the resource ID generator 212, i.e., 42578, is loaded into the resource ID field 568 of object 510. Class number and class type fields 564, 566 of object 510 are preferably loaded with preselected values which suitably configured network devices and entities recognize as indicating that object 510 carries a resource ID for use as described herein.

It should be understood that Path message 500 may include other objects, such as an adspec object carrying parameters that may be used to characterize the path taken by the traffic flow or session.

The RSVP entity 204 then passes the Path message 500 to the voice agent's communication facility 202 for transmission toward voice agent 104 via network 100, as indicated at block 408. The Path message 500 is first received at router 108. The packet/frame receiver transmitter object 302 of router 108 recognizes the received message as an RSVP Path message and, accordingly, passes it to the RSVP engine 316 for processing, as indicated at block 410. The RSVP engine 316 stores the contents of the Path message 500 in data structure 600, as indicated at block 412.

FIG. 6 is a highly schematic illustration of data structure 600 configured as a RSVP session table or array. RSVP session table 600 includes a plurality of columns 602-612 and rows 616a-f whose intersections define corresponding records or cells of the table. Specifically, table 600 includes a source address (SA) column 602, a resource ID column 604, a source port column 606, a destination address (DA) column 608, a destination port column 610, and a previous hop address column 612. As described below, the SA and resource ID columns 602, 604 can be logically combined to form a session group ID, as indicated by column 614. Each row 616a-f of table 600 preferably corresponds to a respective RSVP session.

It should be understood that RSVP session table 600 may include additional information, such as whether or not resources have been reserved for the respective sessions, the reserved bandwidth, etc.

RSVP engine 316 first establishes a new row or entry, e.g., row 616a, for the traffic flow or session with voice agent 104. The RSVP engine 316 then populates the cells or records of this entry 616a with the contents of the received Path message 500. For example, RSVP engine 316 loads the source address and source port from fields 532, 534 into the cells of table entry 616a that correspond to columns 602, 606. It loads the destination address and destination port from fields 558, 560 into the cells that correspond to columns 608, 610. It loads the address of the previous hop node into the cell corresponding to column 612, and it loads the resource ID value from field 568, i.e., 42578, into the cell corresponding to column 604.

Router 108 then loads its IP address into a previous hop object (not shown) that it adds to the Path message 500 and forwards the message 500 toward voice agent 104, as indicated at block 414 (FIG. 4A). Router 108 may consult a routing table (not shown) to determine the interface from which the Path message 500 is to be forwarded. At each hop along the route to voice agent 104, the respective intermediate network device processes the Path message in the same manner as described above. In particular, each device stores the information contained in the Path message 500 in its RSVP session table 600. Each intermediate device also loads its IP address into the previous hop object before forwarding the Path message 500 to the next intermediate network device along the route. Thus, when the Path message 500 reaches its destination (e.g., voice agent 104), each intermediate network device along the route from the sourcing entity will have stored the address of the previous hop along that route so that it will be able to forward messages back to the sourcing entity along the same route used by the Path message 500.

Figure 4B:
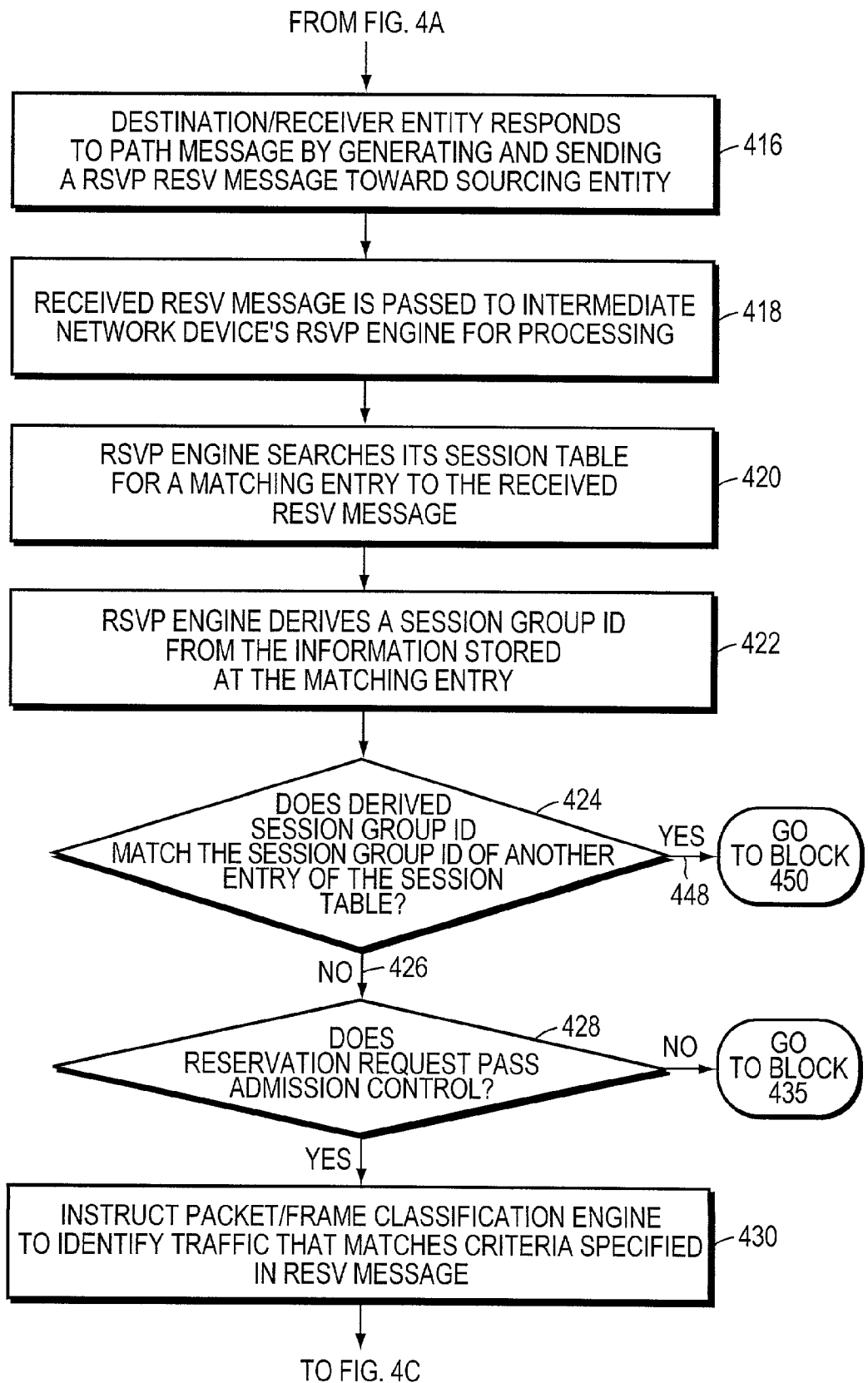

Voice agent 104 preferably responds to the Path message 500 by generating one or more RSVP Reservation (Resv) messages, as indicated at block 416 (FIG. 4B). The Resv message similarly includes a plurality of objects, including a flow spec object, a filter spec object and a session object. The flow spec object, which is similar to the sender Tspec object 506 of the Path message 500, specifies the bandwidth that voice agent 104 requests to be reserved in order to support the traffic flow from voice agent 102. The filter spec object, which is similar to the sender Template object 504 of the Path message 500, specifies the source address and source port of the traffic flow, while the session object, as described above, specifies the destination address and destination port of the traffic flow.

The Resv message travels hop-by-hop back to voice agent 102 following the same route used by the Path message 500. At each hop, the Resv message from voice agent 104 is processed by the respective intermediate network device. More specifically, the Resv message is initially received at router 114. The packet/frame receiver transmitter object 302 of router 114 recognizes the received message as a Resv message and, accordingly, passes it to the RSVP engine 316 for processing, as indicated at block 418. The RSVP engine 316 first searches its RSVP session table 600 to identify the matching entry, e.g., entry 616a, for this Resv message, as indicated at block 420. In particular, the RSVP engine 316 looks for an entry of table 600 whose source address, source port, destination address and destination port match those contained in the received Resv message. As described above, a separate entry 616 of table 600 is established for each session.

Upon locating the matching entry, the RSVP engine 316 derives or computes a logical session group ID for this reservation request by concatenating the source address with the resource ID value from the cells corresponding to columns 602 and 604 of the matching entry, as indicated at block 422. The RSVP engine 316 next determines whether another entry of the RSVP session table 600 has the same logical session group ID, as indicated at decision block 424. If there is no entry having the same logical session group ID, the RSVP engine 316 next performs admission control on the reservation request, as indicated by No arrow 426 leading to decision block 428. More specifically, using the contents of the flowspec spec object, the RSVP engine 316, queries admission control entity 320 to determine whether router 114 has sufficient available resources to support the requested reservation. RSVP engine 316 may also determine whether or not the party making the reservation e.g., voice agent 104, has administrative permission to make the reservation specified in the RSVP Resv message.

Figure 4C:
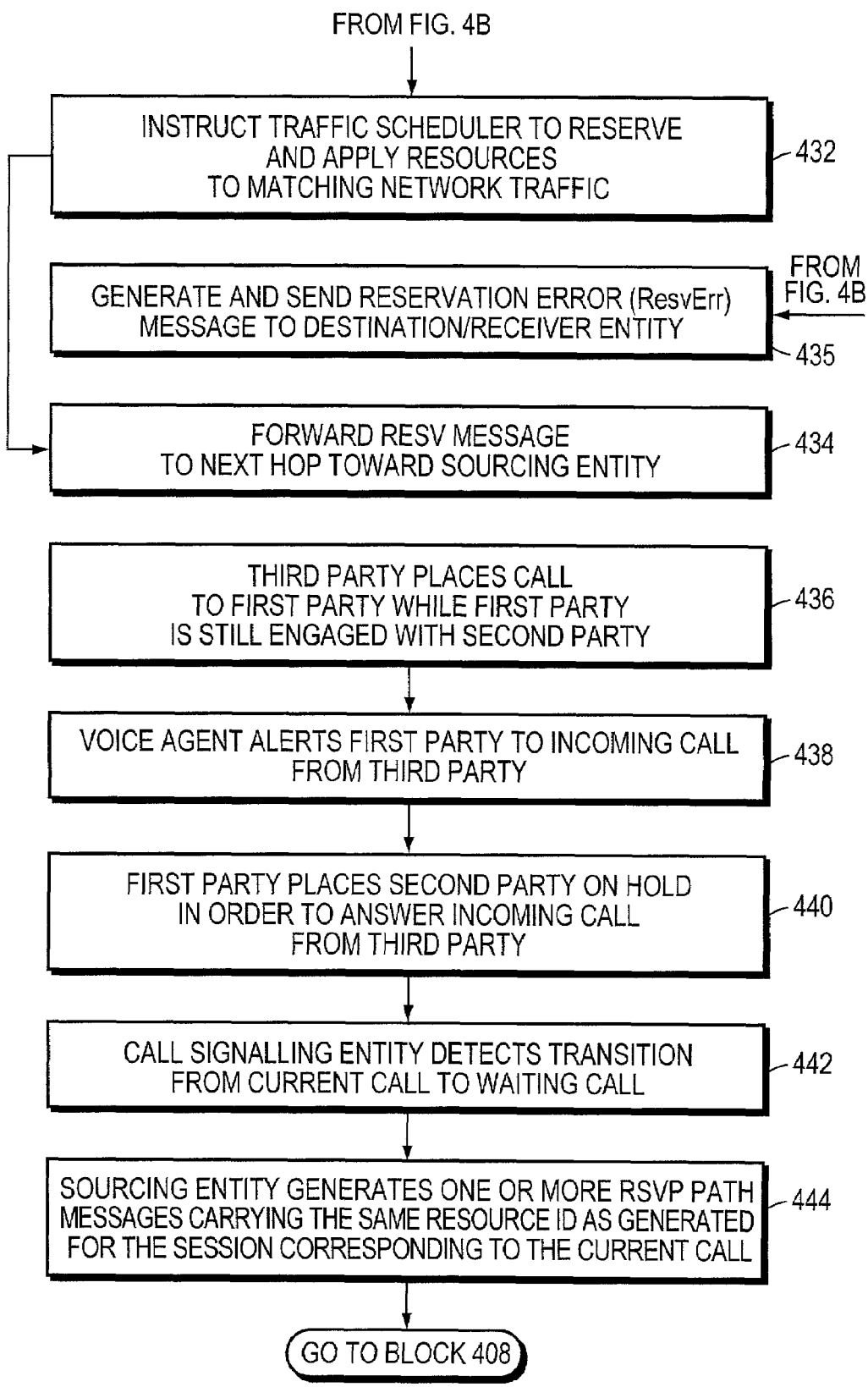

Assuming the reservation represented by the received Resv message passes admission control, the RSVP engine 316 then instructs the packet/frame classification engine 318 to identify received traffic, i.e., packets, matching the criteria contained in the Resv message, such as the filter spec and session spec objects, as indicated at block 430, and directs the traffic scheduler 304 to apply the necessary resources to received traffic matching that criteria to meet the bandwidth requirements contained in the Resv message, as indicated at block 432 (FIG. 4C). In other words, the RSVP engine 316 reserves sufficient resources to support the timing requirements of the session from voice agent 102 to voice agent 104.

Using the stored previous hop address from the matching entry of its RSVP session table 600, intermediate device 114 then forwards the Resv message to the next hop toward the sourcing entity, i.e., toward voice agent 102, as indicated at block 434. If in response to decision block 428 (FIG. 4B), the reservation fails admission control, the RSVP message generator 322 formulates a reservation error (ResvErr) message and sends it back toward the destination/receiving entity, i.e., voice agent 104, as indicated at block 435 (FIG. 4C). The above described processing of the Resv message is preferably repeated at each intermediate device along the route from voice agent 104 to voice agent 102.

At this point resources are reserved along the entire route from voice agent 102 to voice agent 104 (e.g., at routers 108, 110, 114 and 116) to support the traffic flow containing voice information from voice agent 102 to voice agent 104. It should be understood that a similar reservation of resources is made in the opposite direction. That is, voice agent 104 preferably sends one or more Path messages to voice agent 102, and voice agent 102 responds with one or more Resv messages.

Suppose that while the first party at voice agent 102 is talking to the second party at voice agent 104, a third party at voice agent 106 places a call to the first party, as indicated at block 436. The call signaling entity 210 at voice agent 102 preferably alerts the first party of the incoming call, as indicated at block 438. Suppose further that voice agent 102 supports call waiting and that the first party decides to place the second party on hold and answer the call from the third party, as indicated at block 440. Call signaling entity 210 detects the first party's transition from the second party, i.e., from voice agent 104, to the third party, i.e., to voice agent 106, as indicated at block 442. To support the anticipated flow of voice traffic from the first party to the third party, which represents a new session, the call signaling entity 210 at voice agent 102 directs the RSVP entity 204 to ensure that sufficient network resources are made available to support this new traffic flow.

More specifically, call signaling entity 210 directs the RSVP entity 204 to generate and transmit one or more Path messages to voice agent 106, as indicated at block 444. However, because the first party will, at any given instant, only be sending voice traffic to voice agent 106 or, if he or she switches back to the first call, to voice agent 104, the call signaling entity 210 concludes that the network resources reserved for the session to voice agent 104 may be shared with the anticipated session to voice agent 106. Accordingly, the call signaling entity 210 directs the RSVP entity 204 to configure the reservation request such that the previously reserved network resources are shared with the anticipated session to voice agent 106. In particular, call signaling entity 210 directs RSVP entity 204 to re-use the same resource ID, i.e., 42578, that was established for the traffic flow to voice agent 104 in the Path message to be transmitted to voice agent 106, as also indicated at block 444.

In response, the message generator 206 of RSVP entity 204 creates one or more Path messages 500. In fields 558, 560 of the session object 508, the RSVP entity 204 loads the IP address and port number for voice agent 106. In the resource ID field 568 of object 510, the RSVP entity 204 loads the same value, i.e., 42578, used in the Path message 500 that was sent to voice agent 104 as described above. RSVP entity 204 then passes the Path message 500 to communication facility 202 for transmission to voice agent 106 via network 100, as indicated by block 446 which returns processing to block 408 (FIG. 4A). As indicated by blocks 410-414, at each hop along the route to voice agent 106, the respective intermediate network device processes the Path message. In particular, each device creates a new entry, e.g., entry 616e, in its RSVP session table 600 and stores the information contained in the Path message 500 in that new entry. Each intermediate device also loads its IP address into the previous hop object before forwarding it to the next intermediate network device along the route.

Voice agent 106 preferably responds to the Path message 500 from voice agent 102 by generating one or more RSVP Resv messages, as indicated at block 416 (FIG. 4B). The Resv message travels hop-by-hop back to voice agent 102 following the same route used by the Path message 500 that traveled from voice agent 102 to voice agent 106. At each hop, the Resv message from voice agent 106 is processed by the respective intermediate network device. More specifically, the Resv message is initially received at router 116. The packet/frame receiver transmitter object 302 of router 116 recognizes the received message as a Resv message and, accordingly, passes it to the RSVP engine 316 for processing, as indicated at block 418. The RSVP engine 316 first searches its RSVP session table 600 to identify the matching entry, i.e., entry 616e, for this Resv message, as indicated at block 420.

Figure 4D:
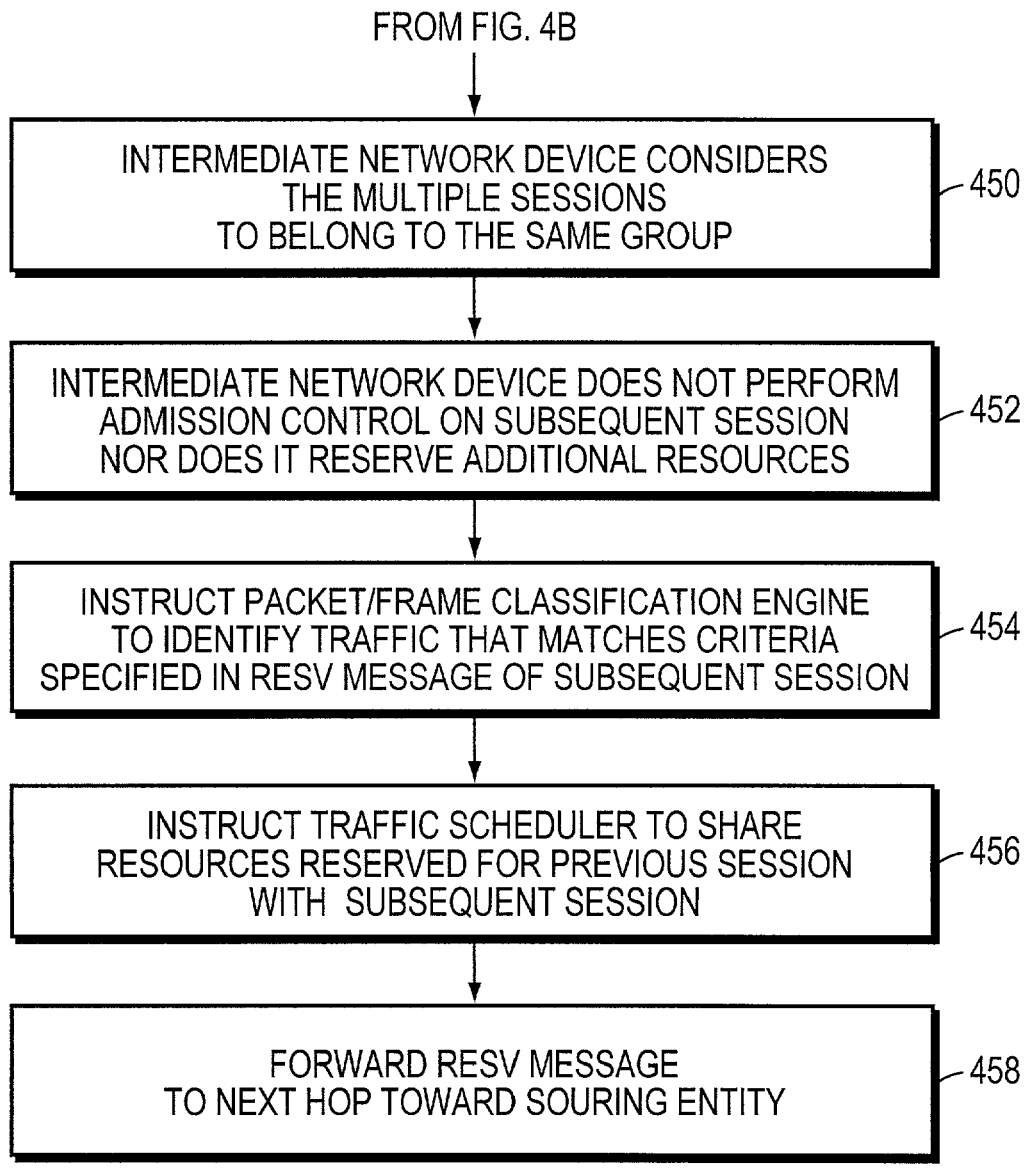

Upon locating the matching entry, the RSVP engine 316 computes or derives a logical session group ID for this reservation request by concatenating the source address and the resource ID as contained in the cells of entry 616e corresponding to columns 602 and 604, as indicated at block 422. The RSVP engine 316 next determines whether another entry of the RSVP session table 600 has the same logical session group ID, as indicated at decision block 424. Because the same resource ID value, i.e., 42578, was used in the previous Path message 500 from voice agent 102 to voice agent 104, there will be at least one matching entry, i.e., entry 616a. In response to detecting a matching entry, router 116 considers the two sessions from voice agent 102 (i.e., the traffic flow to voice agent 104 and the traffic flow to voice agent 106) to belong to the same group, as indicated by Yes arrow 448 leading to block 450 (FIG. 4D). If the resources previously allocated to this group are sufficient to support the new session (e.g., if the first and second session require the same amount of bandwidth), RSVP entity 316 does not perform admission control on the reservation request contained in the Resv message from voice agent 106, as indicated at block 452. It also does not reserve additional resources to support the voice traffic from voice agent 102 to voice agent 104, as also indicated at block 452.

Once it has been established that the correct amount of resources is available, RSVP entity 316 directs the packet/frame classification engine 318 to identify received traffic, i.e., packets, matching the criteria contained in the Resv message from voice agent 106, such as the filter spec and session objects, as indicated at block 454, and directs the traffic scheduler 304 to apply the resources previously reserved for the session from voice agent 102 to voice agent 104 to be applied to this session, i.e., to the traffic flow from voice agent 102 to voice agent 106, as indicated at block 456. Thus, the network resources reserved to support the session to voice agent 104 are shared with the session to voice agent 106. Router 116 then forwards the Resv message to the next hop toward the sourcing entity, i.e., toward voice agent 102, as indicated at block 458.

It should be understood that the RSVP engines 316 of the intermediate network devices may also confirm that resources have already been reserved and assigned to the matching traffic flow before determining that the two sessions may share the same resources. If resources have not yet been reserved to the prior session, then the RSVP engines 316 perform admission control and reserve resources for the subsequent session in a conventional manner. Furthermore, if the resources required by the new session exceed those currently allocated to the prior session, then the incremental resources need to be reserved. In this case, admission control is required.

It should be understood that voice agents 102, 104, 106 periodically issue Path and Resv messages in order to refresh the soft states maintained by the state machine engines 324 of the network devices. The Path messages used to refresh RSVP state preferably contain the same resource ID used in the first Path message for the respective session. Accordingly, each voice agent 102, 104, 106 preferably stores the resource IDs in use by them.

Intermediate network devices that have not been configured to recognize the resource ID object 510 simply process the Path messages containing such objects in a conventional manner. That is, these legacy devices look for entries matching the session ID of received Resv messages and do not share resources among different sessions, even if those sessions will not be transmitting traffic at the same time.

It should further be understood that the present invention can be used with other reservation or signaling protocols besides RSVP. For example, the present invention can be advantageously used with ATM signaling protocols, such as Q.2931.

It should be further understood that the resource ID generator 212 may be disposed at or otherwise be accessible to the call signaling entity 210. In this case, the call signaling entity 210 would generate the resource ID and pass it to the RSVP entity 204 for use in RSVP reservation requests. The resource ID values could also be alphanumeric strings or other locally unique values.

It should also be understood that the present invention can be implemented with other voice agents, such as personal computers (PCs) running one or more communication applications that include RSVP support, such as NetMeeting from Microsoft Corp. of Redmond, Wash. and/or Intel Internet Phone from Intel Corp. of Santa Clara, Calif. VoIP or Internet telephones may also be used as voice agents in the manner described herein.

Also, it should be understood that the voice traffic described herein may be exchanged between multimedia terminal adapters coupled to cable modems, which, in turn, are connected to a cable network. In this case, the corresponding cable modem termination systems (CMTSs) would generate the Path messages containing the resource ID objects 510.

The foregoing description has been directed to specific embodiments of this invention. It will be apparent, however, that other variations and modifications may be made to the described embodiments, with the attainment of some or all of their advantages. For example, the present invention can be used with other time-sensitive or high bandwidth traffic flows besides voice, such as video or multimedia traffic flows. Therefore, it is an object of the appended claims to cover all such variations and modifications as come within the true spirit and scope of the invention.

What is claimed is:

1. An intermediate network device for use in a computer network carrying network traffic corresponding to sessions, the intermediate network device comprising:
    a traffic scheduler having one or more resources for use in forwarding network traffic received at the device at different rates;
    a classification engine configured to identify the received network traffic based upon predefined criteria;
    a resource reservation engine in communicating relationship with the traffic scheduler and the classification engine;
    a receiver arranged to receive a first request from a first sourcing entity for a first session to a first receiving entity, wherein the first session is assigned a session group identifier (ID), the receiver further arranged to receive a second request from the first sourcing entity for a second session to a second receiving entity, wherein the second request is assigned a second group identifier (ID); and
    wherein, in response to the requests to reserve resources, the resource reservation engine determines whether the session group ID of the first session matches the session group ID of the second session and, if so, directs the traffic scheduler to share resources that are reserved for the second session with the first session.

2. The intermediate network device of claim 1 wherein the resource reservation engine includes a data structure for storing information for the sessions, and the resource reservation engine stores a session group identifier (ID) for each session in the data structure.

3. The intermediate network device of claim 2 wherein the session group identifier associated with a given session includes a source address of an entity sourcing the traffic flow of the given session and a resource identifier (ID).

4. The intermediate network device of claim 1 wherein:
    the resource reservation engine utilizes the Resource reSerVation Protocol (RSVP) specification standard, and
    the session group ID of a given session is contained in a RSVP Path message associated with the given session.

5. The intermediate network device of claim 4 wherein the first and the second sessions carry voice information.

6. The intermediate network device of claim 5 wherein the first and the second sessions originate from a single sourcing entity.

7. The intermediate network device of claim 1 wherein the first and the second sessions carry voice information and correspond to a call waiting context.

8. A method for reserving resources by a network device for transmission of messages through a computer network comprising:
    receiving a first request from a sourcing entity for initiating a first session to a first receiving entity by the network device;
    identifying the first session by writing a session group identifier (session ID) into packets of the first session;
    receiving a second request from the sourcing entity for initiating a second session to a second receiving entity for initiating a second session using the session ID of the first session; and
    transmitting a setup message to enable other network devices to share resources between the first session and the second session in response to both the first and second sessions having the same session ID.

9. The method of claim 8 further comprising:
    including a data structure for storing information for the sessions in a resource reservation engine, and
    storing the session ID for each session in the data structure in the resource reservation engine.

10. The method of claim 9 further comprising:
    identifying a given session by a source address of an entity sourcing the traffic flow of the session and a resource identifier (ID).

11. The method of claim 8 further comprising:
utilizing the Resource reSerVation Protocol (RSVP) specification standard in the resource reservation engine, and
inserting the session ID of a session in a RSVP Path message associated with the given session.

12. The method of claim 11 further comprising:
carrying voice information over the first and the second sessions.

13. The method of claim 12 further comprising:
originating the first and the one or more second sessions from a single sourcing entity.

14. The method of claim 12 further comprising:
carrying voice information which corresponds to a call waiting context over the first and the second sessions carry voice information.

15. A network device for reserving resources in transmission of messages through a computer network comprising:
means for receiving a first request from a sourcing entity for initiating a first session to a first receiving entity;
means for identifying the first session by writing a session group identifier (session ID) into packets of the first session;
means for receiving a second request from the sourcing entity for initiating a second session to a second receiving entity using the session ID of the first session; and
means for transmitting a setup message to enable other network devices to share resources between the first session and the second session in response to both the first and second sessions having the same session ID.

16. The device of claim 15 further comprising:
means for including a data structure for storing information for the sessions in a resource reservation engine, and
means for storing the session ID for each session in the data structure in the resource reservation engine.

17. The device of claim 16 further comprising:
means for identifying a given session by a source address of an entity sourcing the traffic flow of the session and a resource identifier (ID).

18. The device of claim 15 further comprising:
means for utilizing the Resource reSerVation Protocol (RSVP) specification standard in the resource reservation engine, and
means for inserting the session ID of a session in a RSVP Path message associated with the given session.

19. The device of claim 18 further comprising:
means for carrying voice information over the first and the second sessions.

20. The device of claim 19 further comprising:
means for originating the first and the second sessions from a single sourcing entity.

21. The device of claim 19 further comprising:
means for carrying voice information which corresponds to a call waiting context over the first and the second sessions carry voice information.

22. A system for reserving resources in transmitting messages through a computer network comprising:
an intermediate network device adapted to (a) initiate a first session to a first receiving entity, (b) identify the first session by writing a session group identifier (session ID) into packets of the first session, (c) initiate one or more second sessions to one or more second receiving entities using the session ID of the first session, and (d) transmit a setup message to enable other network devices to share resources between the first session and the second session in response to both the first and second sessions having the same session ID.

23. The system of claim 22 wherein a data structure is included for storing information for the sessions in a resource reservation engine, and wherein the session ID for each session is stored in the data structure in the resource reservation engine.

24. The system of claim 23 wherein a given session is identified by a source address of an entity sourcing the traffic flow of the session and a resource identifier (ID).

25. The system of claim 22 wherein a Resource reSerVation Protocol (RSVP) specification standard is utilized in the resource reservation engine, and wherein the session ID of a session is inserted in a RSVP Path message associated with the given session.

26. The system of claim 22 wherein the first and the one or more second sessions carry voice information.

27. The system of claim 22 wherein the first and the one or more second sessions originate from a single sourcing entity.

28. The system of claim 22 wherein the first and the one or more second sessions carry voice information and correspond to a call waiting context.

29. Software encoded in one or more tangible computer-readable media and when executed operable to:
initiate a first session to a first receiving entity by a network device;
identifying the first session by writing a session group identifier (session ID) into packets of the first session;
initiate one or more second sessions to one or more second receiving entities using the session ID of the first session; and
transmit a setup message to enable other network devices to share resources between the first session and the second session in response to both the first and second sessions having the same session ID.

30. A method for reserving resources to transmit messages through a computer network comprising:
selecting a group session ID for establishing a first session;
establishing the first session from a network sourcing device to a first network receiving device routing through an intermediate network device;
using the same group session ID for establishing a second session;
establishing the second session from the network sourcing device to a second network receiving device routing through the intermediate network device; and
sharing, in response to the first session and the second session having the same group session ID, resources reserved for the first session with the second session.

31. The method of claim 30, further comprising:
receiving by the intermediate network device a first message of the first session and a second message of the second session, the first message and the second message having the same group session ID; and
sharing by the intermediate network device, in response to the first message and the second message having the same group session ID, resources reserved for the first session with the second session.

32. A network device for reserving resources to transmit messages through a computer network comprising:
means for selecting a group session ID for establishing a first session;
means for establishing the first session from a network sourcing device to a first network receiving device routing through an intermediate network device;

means for using the same group session ID for establishing a second session;

means for establishing the second session from the network sourcing device to a second network receiving device routing through the intermediate network device; and means for sharing, in response to the first session and the second session having the same group session ID, resources reserved for the first session with the second session.

33. The method of claim 32, further comprising:

means for receiving by the intermediate network device a first message of the first session and a second message of the second session; and means for sharing by the intermediate network device, in response to the first message and the second message having the same group session ID, resources reserved for the first session with the second session.

34. A network device for reserving resources to transmit messages through a computer network comprising:

a signaling entity configured to detect a situation where a second session between a network sourcing device and a second network receiving device can share the resources reserved for a first session between the network sourcing device and a first network receiving device;

a resource identifier (ID) generator configured to, in response to a situation where the second session can share resources reserved for the first session, select a same group session ID for the first session and the second session; and a message generator configured to send a first message to establish the first session, and to send a second message to establish the second session, the message generator including the group session ID in both the first message and the second message.

* * * * *